United States Patent
Atluri et al.

(10) Patent No.: US 9,871,733 B2
(45) Date of Patent: Jan. 16, 2018

(54) POLICER ARCHITECTURE

(71) Applicant: CAVIUM, INC., San Jose, CA (US)

(72) Inventors: Srinath Atluri, Fremont, CA (US);
Weihuang Wang, Los Gatos, CA (US);
Weinan Ma, San Jose, CA (US)

(73) Assignee: Cavium, Inc., San Jose, CA (US)

( * ) Notice: Subject to any disclaimer, the term of this patent is extended or adjusted under 35 U.S.C. 154(b) by 0 days.

(21) Appl. No.: 14/676,679

(22) Filed: Apr. 1, 2015

(65) Prior Publication Data

US 2016/0142322 A1    May 19, 2016

Related U.S. Application Data

(60) Provisional application No. 62/079,484, filed on Nov. 13, 2014.

(51) Int. Cl.
| | | |
|---|---|---|
| *H04L 12/813* | (2013.01) | |
| *H04L 12/863* | (2013.01) | |
| *H04L 12/931* | (2013.01) | |
| *H04L 12/54* | (2013.01) | |
| *H04L 27/26* | (2006.01) | |
| *H04L 29/08* | (2006.01) | |

(52) U.S. Cl.
CPC .......... *H04L 47/20* (2013.01); *H04L 29/0854* (2013.01); *H04L 47/627* (2013.01); *H04L 49/503* (2013.01); *H04L 12/5602* (2013.01); *H04L 27/2655* (2013.01); *H04L 27/2689* (2013.01); *H04L 67/2852* (2013.01)

(58) Field of Classification Search
CPC ..... H04L 2012/5636; H04L 2012/5637; H04L 47/20; H04L 47/21; H04L 47/215; H04L 47/627; H04L 49/3081; H04L 49/503; H04L 12/5602; H04L 29/0854; H04L 27/2689; H04L 67/2852; H04L 27/2655
USPC ............ 370/235, 235.1, 229, 412, 363, 230, 370/395.21, 395.43, 232, 395.41, 230.1, 370/252, 256, 468; 709/203, 235
See application file for complete search history.

(56) References Cited

U.S. PATENT DOCUMENTS

| | | | |
|---|---|---|---|
| 5,274,644 A * | 12/1993 | Berger ................ | H04L 12/5602 370/230 |
| 6,711,165 B1 | 3/2004 | Tzeng | |
| 6,823,150 B1 * | 11/2004 | Cao ...................... | G03G 15/205 399/69 |
| 7,215,637 B1 * | 5/2007 | Ferguson ................ | H04L 45/00 370/230.1 |
| 7,266,606 B2 * | 9/2007 | Ganti ..................... | H04L 47/10 370/229 |
| 7,280,476 B2 * | 10/2007 | Anderson ........... | H04L 12/5602 370/230 |
| 8,077,611 B2 * | 12/2011 | Bettink .................. | H04L 47/10 370/230 |

(Continued)

*Primary Examiner* — Edan Orgad
*Assistant Examiner* — Ivan O Latorre
(74) *Attorney, Agent, or Firm* — Haverstock & Owens LLP

(57) ABSTRACT

A policer system on one or more place and/or route blocks. The policer system including a plurality of local physical policers each stored in a plurality of physical memory banks and coupled with a plurality of global policers stored in one or more global banks separate from the physical banks. Thus, each bank of the global policers are able to represent a logical combination of a plurality of the physical banks of physical policers.

52 Claims, 5 Drawing Sheets

(56) References Cited

U.S. PATENT DOCUMENTS

| | | | |
|---|---|---|---|
| 8,542,602 B2 * | 9/2013 | Nandagopal | H04L 12/5693 370/235 |
| 8,671,220 B1 | 3/2014 | Garg et al. | |
| 8,725,873 B1 | 5/2014 | Bromberg | |
| 8,799,624 B1 | 8/2014 | Griffin et al. | |
| 9,246,823 B1 * | 1/2016 | Sukonik | H04L 47/20 |
| 9,331,929 B1 | 5/2016 | Thomas et al. | |
| 2006/0045074 A1 | 3/2006 | Lee | |
| 2006/0059315 A1 | 3/2006 | Moll | |
| 2006/0221819 A1 * | 10/2006 | Padwekar | H04L 47/20 370/229 |
| 2008/0005780 A1 * | 1/2008 | Singleton | G06F 21/552 726/1 |
| 2009/0028045 A1 | 1/2009 | Stellenberg et al. | |
| 2011/0022791 A1 * | 1/2011 | Iyer | G06F 12/08 711/105 |
| 2011/0153840 A1 * | 6/2011 | Narayana | H04L 67/1029 709/227 |
| 2011/0268119 A1 * | 11/2011 | Pong | H04L 47/32 370/392 |
| 2011/0292830 A1 | 12/2011 | Yanggratoke et al. | |
| 2012/0224486 A1 * | 9/2012 | Battestilli | H04L 47/125 370/237 |
| 2012/0294317 A1 * | 11/2012 | Livne | H04L 47/58 370/462 |
| 2013/0201831 A1 * | 8/2013 | Tal | H04L 47/625 370/235 |
| 2013/0246698 A1 | 9/2013 | Estan et al. | |
| 2014/0112147 A1 * | 4/2014 | Esposito | H04L 47/215 370/235.1 |
| 2014/0143300 A1 * | 5/2014 | Karlsson | H04L 67/101 709/203 |
| 2014/0201470 A1 * | 7/2014 | Joshua | G06F 12/0831 711/147 |
| 2015/0124614 A1 | 5/2015 | Alizadeh Attar et al. | |
| 2015/0312156 A1 * | 10/2015 | Kitada | H04L 43/0882 370/235 |
| 2016/0088020 A1 * | 3/2016 | Chan | H04L 63/20 726/1 |
| 2016/0173104 A1 * | 6/2016 | Vassiliev | H03K 19/17736 326/41 |

\* cited by examiner

- Physical policer

| bckt_cnt_p | time_stamp_p | local_delta_p | bckt_cnt_c | time_stamp_c | local_delta_c |
|---|---|---|---|---|---|
| 42 | 10 | 42 | 42 | 10 | 42 |

- Global policer

| bckt_cnt_p | time_stamp_p | global_delta_p | bckt_cnt_c | time_stamp_c | global_delta_c |
|---|---|---|---|---|---|
| 42 | 10 | 85 | 42 | 10 | 85 |

Fig. 2 ers of one of the physical memory banks with a state of
the associated global policer during a cycle. In some
embodiments, the state of each of the physical policers and
the global policers comprise a bucket value, a time stamp
and a delta value, and further wherein the time stamp value
of each of the physical policers represents when the physical
policer was last synchronized with the associated global
policer, the delta value of each of the physical policers
represents a quantity of data units of a traffic flow that have
accessed the physical policer since the physical policer was
last synchronized with the associated global policer and the
bucket value of each of the physical policers represents a
first number equal to the data units of the traffic flow that
have accessed the physical policer during a first period
minus a second number, wherein the second number is equal
to a leakage rate of the physical policer multiplied by the
first period. In some embodiments, the scheduler element
determines the one of the physical policers that is selected
from the one of the physical memory banks based on which
of the physical policers of the one of the physical memory
banks was accessed by incoming traffic during the cycle. In
some embodiments, the scheduler element determines the
one of the physical memory banks from which to select the
one of the physical policers based on a repeating pattern
such that after a predetermined number of cycles the scheduler element will have selected the one of the physical
policers from all the physical memory banks. In some
embodiments, the local synchronization comprises determining a new global bucket value by determining an added
value by adding the delta value of the one of the physical
policers that is selected and the bucket value of the associated global policer, determining a leakage value by multiplying a leakage rate of the associated global policer by a
difference between the time stamp value of the associated
global policer and the current time and subtracting the
leakage value from the added value. In some embodiments,
the local synchronization comprises replacing the bucket
values of the of the states of the one of the physical policers
and the associated global policer with the new global bucket
value. In some embodiments, the system further comprises
a plurality of additional physical memory banks each storing
a plurality of additional physical policers, an additional
global memory bank storing a plurality of additional global
policers, wherein each of the additional global policers is
associated with a different one of the additional physical
policers in each of the additional physical memory banks
and an additional scheduler element coupled with the additional physical memory banks and the additional global
memory bank, wherein the additional scheduler element
performs the local synchronization that synchronizes a state
of one of the additional physical policers of one of the
additional physical memory banks with a state of the associated additional global policer during an additional cycle,
wherein the global memory bank is coupled with the additional global memory bank, each of the global policers are
associated with a different one of the additional global
policers, and the scheduler element and the additional scheduler element are configured to perform a global synchronization that synchronizes a state of one of the global policers
with a state of one of the additional global policers associated with the one of the global policers during a global cycle.
In some embodiments, the time stamp value of each of the
global policers represents when the global policer was last
globally or locally synchronized, the delta value of each of
the global policers represents a quantity of the data units of
the traffic flow that have accessed the global policer since the
global policer was last globally or locally synchronized with

POLICER ARCHITECTURE

RELATED APPLICATIONS

This application claims priority under 35 U.S.C. §119(e)
of the U.S. provisional patent application Ser. No. 62/079,
484, filed Nov. 13, 2014, and titled "POLICER ARCHITECTURE," which is hereby incorporated by reference.

FIELD OF INVENTION

The present invention relates to the policing of traffic on
one or more traffic place and/or route blocks. More particularly, the present invention relates to one or more logical
policers coupled with a plurality of physical policers.

BACKGROUND OF THE INVENTION

Traditionally, policers are each implemented as one entry
inside a physical memory. As a result, access during each
cycle is limited to a single call and write of the memory bank
and thus a single policer per cycle. This causes problems
when traffic from multiple pipelines wants to access the
same policer during the same cycle. As a result, it limits the
ability to adjust for situations where the traffic rate is
exceeding memory bandwidth. Thus, the policer architecture has the drawback of limited capabilities without
increasing physical memory access which conversely
increases memory costs.

In communications, traffic policing is the process of
monitoring network traffic with policers for compliance with
a traffic contract and taking steps to enforce that contract.
Traffic sources which are aware of a traffic contract may
apply traffic shaping to ensure their output stays within the
contract and is thus not discarded. Traffic exceeding a traffic
contract may be discarded immediately, marked as non-compliant, or left as-is, depending on administrative policy
and the characteristics of the excess traffic. Policers that are
implemented as one entry inside physical memory limit the
system to only one access to one policer per cycle such that
no multiple requests possible. This creates the drawback of
preventing traffic from a plurality of pipelines trying to
access the same policer, preventing traffic from multiple
processing elements trying to access the same policer and/or
limiting the system to be only able to handle traffic rates
withing the memory bandwidth.

BRIEF SUMMARY OF THE INVENTION

A policer system on one or more place and/or route
blocks. The policer system including a plurality of local
physical policers each stored in a plurality of physical
memory banks and coupled with a plurality of global
policers stored in one or more global banks separate from the
physical banks. Thus, each bank of the global policers are
able to represent a logical combination of a plurality of the
physical banks of physical policers.

A first aspect is directed to a traffic policer system for
policing traffic. The system comprises a plurality of physical
memory banks each storing a plurality of physical policers,
a global memory bank storing a plurality of global policers,
wherein each of the global policers is associated with a
different one of the physical policers in each of the physical
memory banks and a scheduler element coupled with the
physical memory banks and the global memory bank,
wherein the scheduler element performs a local synchronization that synchronizes a state of one of the physical one of the additional global policers and the bucket value of each of the global policers represents a third number equal to the data units of the traffic flow that have accessed the global policer during a second period minus a fourth number, wherein the fourth number is equal to a leakage rate of the global policer multiplied by the second period. In some embodiments, the physical memory banks, the global memory bank and the scheduler element are stored on a processing block, and the additional physical memory banks, the additional global memory bank and the additional scheduler element are stored on an additional processing block coupled with the processing block. In some embodiments, the scheduler element and the additional scheduler element initiate and perform the global synchronization independently such that each of the scheduler element and the additional scheduler element are able to perform the global synchronization during different cycles. In some embodiments, the scheduler element determines the one of the global policers based on which of the global policers was accessed by incoming traffic during the global cycle and the additional scheduler element determines the one of the additional global policers based on which of the additional global policers was accessed by incoming traffic during the global cycle. In some embodiments, the global synchronization comprises determining an updated global bucket value by determining a global added value by adding the bucket value of the one of the global policers that is selected and the delta value of the one of the addition global policers, determining a global leakage value by multiplying a leakage rate of the one of the global policers by a difference between the time stamp value of the one of the global policers and the current time and subtracting the leakage value from the added value. In some embodiments, the scheduler element performs a global refresh process including a full local synchronization that, for each of the global policers, synchronizes the states of the global policer and all of the physical policers associated with the global policer during a global refresh period. In some embodiments, the full local synchronization comprises, for each of the global policers, consecutively performing the local synchronization with each of the physical policers associated with the global policer. In some embodiments, the global refresh process includes a full global synchronization that, for each of the global policers, synchronizes the state of the global policer with the state of all of the additional global policers associated with the global policer during the global refresh period. In some embodiments, the full global synchronization comprises, for each of the global policers, consecutively performing the global synchronization with each of the additional global policers associated with the global policer. In some embodiments, each of the data units is either a byte or an entire packet of the traffic.

A second aspect is directed to a traffic scheduler stored on a non-transitory computer readable medium and configured to control traffic on a policer system, wherein the scheduler is coupled with a plurality of physical memory banks each storing a plurality of physical policers and a global memory bank storing a plurality of global policers, wherein each of the global policers is associated with a different one of the physical policers in each of the physical memory banks, and further wherein the scheduler is configured to perform a local synchronization that synchronizes a state of one of the physical policers of one of the physical memory banks with a state of the associated global policer during a cycle. In some embodiments, the state of each of the physical policers and the global policers comprise a bucket value, a time stamp and a delta value, and further wherein the time stamp value of each of the physical policers represents when the physical policer was last synchronized with the associated global policer, the delta value of each of the physical policers represents a quantity of data units of a traffic flow that have accessed the physical policer since the physical policer was last synchronized with the associated global policer and the bucket value of each of the physical policers represents a first number equal to the data units of the traffic flow that have accessed the physical policer during a first period minus a second number, wherein the second number is equal to a leakage rate of the physical policer multiplied by the first period. In some embodiments, the scheduler determines the one of the physical policers that is selected from the one of the physical memory banks based on which of the physical policers of the one of the physical memory banks was accessed by incoming traffic during the cycle. In some embodiments, the scheduler determines the one of the physical memory banks from which to select the one of the physical policers based on a repeating pattern such that after a predetermined number of cycles the scheduler will have selected the one of the physical policers from all the physical memory banks. In some embodiments, the local synchronization comprises determining a new global bucket value by determining an added value by adding the delta value of the one of the physical policers that is selected and the bucket value of the associated global policer, determining a leakage value by multiplying a leakage rate of the associated global policer by a difference between the time stamp value of the associated global policer and the current time and subtracting the leakage value from the added value. In some embodiments, the local synchronization comprises replacing the bucket values of the of the states of the one of the physical policers and the associated global policer with the new global bucket value. In some embodiments, each of the global policers are associated with a different one of additional global policers, and the scheduler performs a global synchronization that synchronizes a state of one of the global policers with a state of one of the additional global policers associated with the one of the global policers during a global cycle. In some embodiments, the delta value of each of the global policers represents a quantity of the data units of the traffic flow that have accessed the global policer since the latest global synchronization of the global policer with the associated one of the additional global policers and the bucket value of each of the global policers represents a third number of the data units of the traffic flow that have accessed the global policer during a second time period minus a fourth number of the data units, wherein the fourth number is equal to a leakage rate of the global policer multiplied by the second time period, and further wherein the second time period is equal to the difference between the current time and a global policer time value of the time stamp of the global policer. In some embodiments, the non-transitory computer-readable medium is a part of a processing block and the additional global policers are stored on an additional global memory bank that is a part of an additional processing block coupled with the processing block. In some embodiments, the scheduler initiates and performs the global synchronization independent of performance of the global synchronization by an additional scheduler on the additional processing block. In some embodiments, the scheduler determines the one of the global policers based on which of the global policers was accessed by incoming traffic during the global cycle. In some embodiments, the global synchronization comprises determining an updated global bucket value by determining a global added value by adding the bucket value of the one of the global policers that is selected and the delta value of the one of the addition global policers, determining a global leakage value by multiplying a leakage rate of the one of the global policers by a difference between the time stamp value of the one of the global policers and the current time and subtracting the leakage value from the added value. In some embodiments, the scheduler performs a global refresh process including a full local synchronization that, for each of the global policers, synchronizes the states of the global policer and all of the physical policers associated with the global policer during a global refresh period. In some embodiments, the full local synchronization comprises, for each of the global policers, consecutively performing the local synchronization with each of the physical policers associated with the global policer. In some embodiments, the global refresh process includes a full global synchronization that, for each of the global policers, synchronizes the state of the global policer with the state of all of the additional global policers associated with the global policer during the global refresh period. In some embodiments, the full global synchronization comprises, for each of the global policers, consecutively performing the global synchronization with each of the additional global policers associated with the global policer. In some embodiments, each of the data units is either a byte or an entire packet of the traffic.

A third aspect is directed to a method of performing synchronization on a policer traffic system stored on an non-transitory computer-readable medium and including a plurality of physical memory banks each storing a plurality of physical policers and a global memory bank storing a plurality of global policers, wherein each of the global policers is associated with a different one of the physical policers in each of the physical memory banks. The method comprises selecting one of the plurality of physical memory banks with a scheduler, selecting one of the plurality of physical policers on the selected physical bank and performing a local synchronization with the scheduler by synchronizing a state of the one of the physical policers of the one of the physical memory banks with a state of one of the global policers associated with the one of the physical policers during a cycle, wherein the scheduler is coupled with the physical memory banks and the global memory bank. In some embodiments, the state of each of the physical policers and the global policers comprise a bucket value, a time stamp and a delta value, and further wherein the time stamp value of each of the physical policers represents when the physical policer was last synchronized with the associated global policer, the delta value of each of the physical policers represents a quantity of data units of a traffic flow that have accessed the physical policer since the physical policer was last synchronized with the associated global policer and the bucket value of each of the physical policers represents a first number equal to the data units of the traffic flow that have accessed the physical policer during a first period minus a second number, wherein the second number is equal to a leakage rate of the physical policer multiplied by the first period. In some embodiments, the scheduler selects the one of the physical policers based on which of the physical policers of the one of the physical memory banks was accessed by incoming traffic during the cycle. In some embodiments, the scheduler selects the one of the physical memory banks based on a repeating pattern such that after a predetermined number of cycles the scheduler will have selected all of the physical memory banks at least once. In some embodiments, the local synchronization comprises determining a new global bucket value by adding the delta value of the one of the physical policers that is selected and the bucket value of the associated global policer. In some embodiments, the local synchronization comprises determining a new global bucket value by determining an added value by adding the delta value of the one of the physical policers that is selected and the bucket value of the associated global policer, determining a leakage value by multiplying a leakage rate of the associated global policer by a difference between the time stamp value of the associated global policer and the current time and subtracting the leakage value from the added value. In some embodiments, the system further comprises a plurality of additional physical memory banks each storing a plurality of additional physical policers, an additional global memory bank storing a plurality of additional global policers, wherein each of the additional global policers is associated with a different one of the additional physical policers in each of the additional physical memory banks and an additional scheduler element coupled with the additional physical memory banks and the additional global memory bank, wherein the additional scheduler element performs the local synchronization that synchronizes a state of one of the additional physical policers of one of the additional physical memory banks with a state of the associated additional global policer during an additional cycle, wherein the global memory bank is coupled with the additional global memory bank and each of the global policers are associated with a different one of the additional global policers. In some embodiments, the delta value of each of the global policers represents a quantity of the data units of the traffic flow that have accessed the global policer since the latest global synchronization of the global policer with the associated one of the additional global policers and the bucket value of each of the global policers represents a third number of the data units of the traffic flow that have accessed the global policer during a second time period minus a fourth number of the data units, wherein the fourth number is equal to a leakage rate of the global policer multiplied by the second time period, and further wherein the second time period is equal to the difference between the current time and a global policer time value of the time stamp of the global policer. In some embodiments, the method further comprises performing a global synchronization with the scheduler and the additional scheduler by synchronizing a state of one of the global policers with a state of one of the additional global policers associated with the one of the global policers during a global cycle. In some embodiments, the physical memory banks, the global memory bank and the scheduler are stored on a processing block, and the additional physical memory banks, the additional global memory bank and the additional scheduler are stored on an additional processing block coupled with the processing block. In some embodiments, the performance of the global synchronization by the scheduler and the performance of the global synchronization by the additional scheduler are independent of each other such that each of the scheduler and the additional scheduler are able to perform the global synchronization during different cycles. In some embodiments, the scheduler determines the one of the global policers based on which of the global policers was accessed by incoming traffic during the global cycle and the additional scheduler determines the one of the additional global policers based on which of the additional global policers was accessed by incoming traffic during the global cycle. In some embodiments, the global synchronization comprises determining an updated global bucket value by determining a global added value by adding the bucket value of the one of the global policers that is selected and the delta value of the one of the addition global policers, determining a global leakage value by multiplying a leakage rate of the one of the global policers by a difference between the time stamp value of the one of the global policers and the current time and subtracting the leakage value from the added value. In some embodiments, the method further comprises performing with the scheduler a global refresh process including a full local synchronization that, for each of the global policers, synchronizes the states of the global policer and all of the physical policers associated with the global policer during a global refresh period. In some embodiments, the full local synchronization comprises, for each of the global policers, consecutively performing the local synchronization with each of the physical policers associated with the global policer. In some embodiments, the global refresh process includes a full global synchronization that, for each of the global policers, synchronizes the state of the global policer with the state of all of the additional global policers associated with the global policer during the global refresh period. In some embodiments, the full global synchronization comprises, for each of the global policers, consecutively performing the global synchronization with each of the additional global policers associated with the global policer. In some embodiments, each of the data units is either a byte or an entire packet of the traffic.

BRIEF DESCRIPTION OF THE DRAWINGS

FIG. 2 illustrates exemplary state fields and state values of one of the physical policers and a corresponding global policer according to some embodiments.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Embodiments are directed to a policer system that implements a logical policer representative of a plurality of physical policers, wherein the logical policer is synchronized with the physical policers according to a schedule such that on average the logical policer is able to provide a unified logical policer. As a result, the policer system is able to produce an approximation of multiple accesses of single physical policers (which are normally limited to single accesses per cycle) by instead providing multiple accesses in one cycle of the logical policer which emulates a combination of the physical policers. In particular, this logical policer has a bandwidth that is the aggregation of all of the associated physical policers and is thereby able to increase efficiency by serving a greater number of accesses each cycle.

Figure 1:
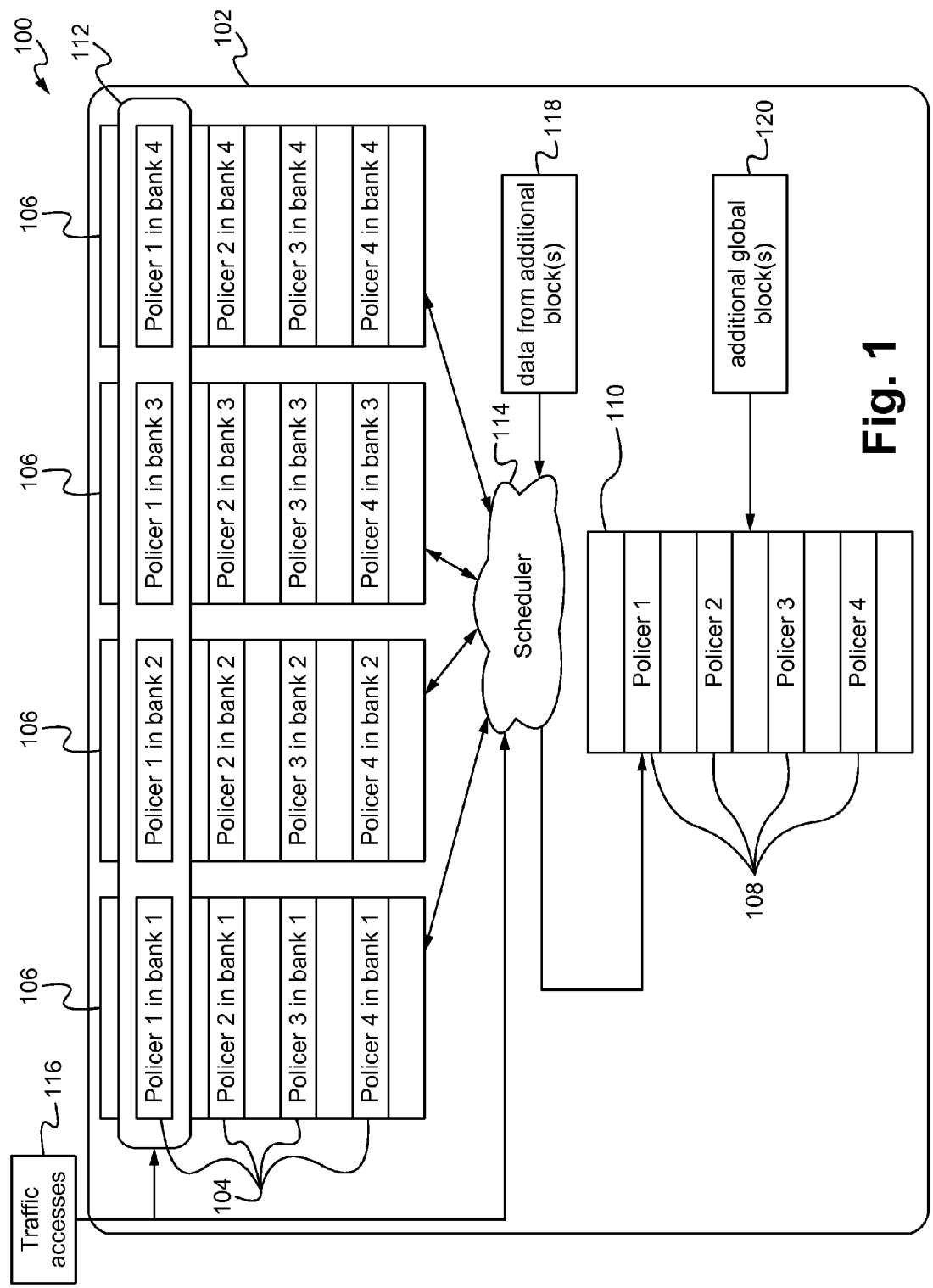
FIG. 1 illustrates a policer system according to some embodiments.

FIG. 1 illustrates a policer system 100 according to some embodiments. As shown in FIG. 1, the policer system 100 is able to be located within one or more place and/or route blocks 102 (e.g. one or more software-defined engines (SDEs), other processing engines). The policer system 100 comprises a plurality of local physical policers 104 each stored in a plurality of physical memory banks 106 and coupled with a plurality of global policers 108 stored in one or more global banks 110 separate from the physical banks 106. The physical policers 104 (and thus the associated global policers 108) are able to police either incoming traffic rate (e.g. data units of incoming packets only) or outgoing traffic rate (e.g. data units of outgoing packets only). It should be noted that both incoming traffic and outgoing traffic with respect to the system 100 are able to be "incoming" traffic with respect to the policers as the traffic accesses the policers and "outgoing" traffic with respect to the policers. Thus, although traffic is able to be referred to herein as incoming or outgoing traffic with respect to the policers, it is understood that the traffic is able to be a part of either an incoming or outgoing traffic stream with respect to the system 100. Further, the physical policers 104 (and thus the associated global policers 108) are able to operate either on a "byte-count mode," or "packet-count mode." In byte-count mode, each data unit represents a byte of data (e.g. packet data). Thus, when a policer is accessed by a packet including X number of bytes, the policer counts the access as being accessed by X data units (for the purpose of incrementing the delta value as described below). In contrast, in packet-count mode each data unit represents a whole packet. Thus, when a policer is accessed by a packet, regardless of the number of bytes of the packet, the policer counts the access as being accessed by a single data unit (again for the purpose of incrementing the delta value as described below). Alternatively, the data units are able to have other levels of granularity (e.g. bits, groups of bytes, kilobytes, groups of packets, and/or other sized groups).

Figure 4:
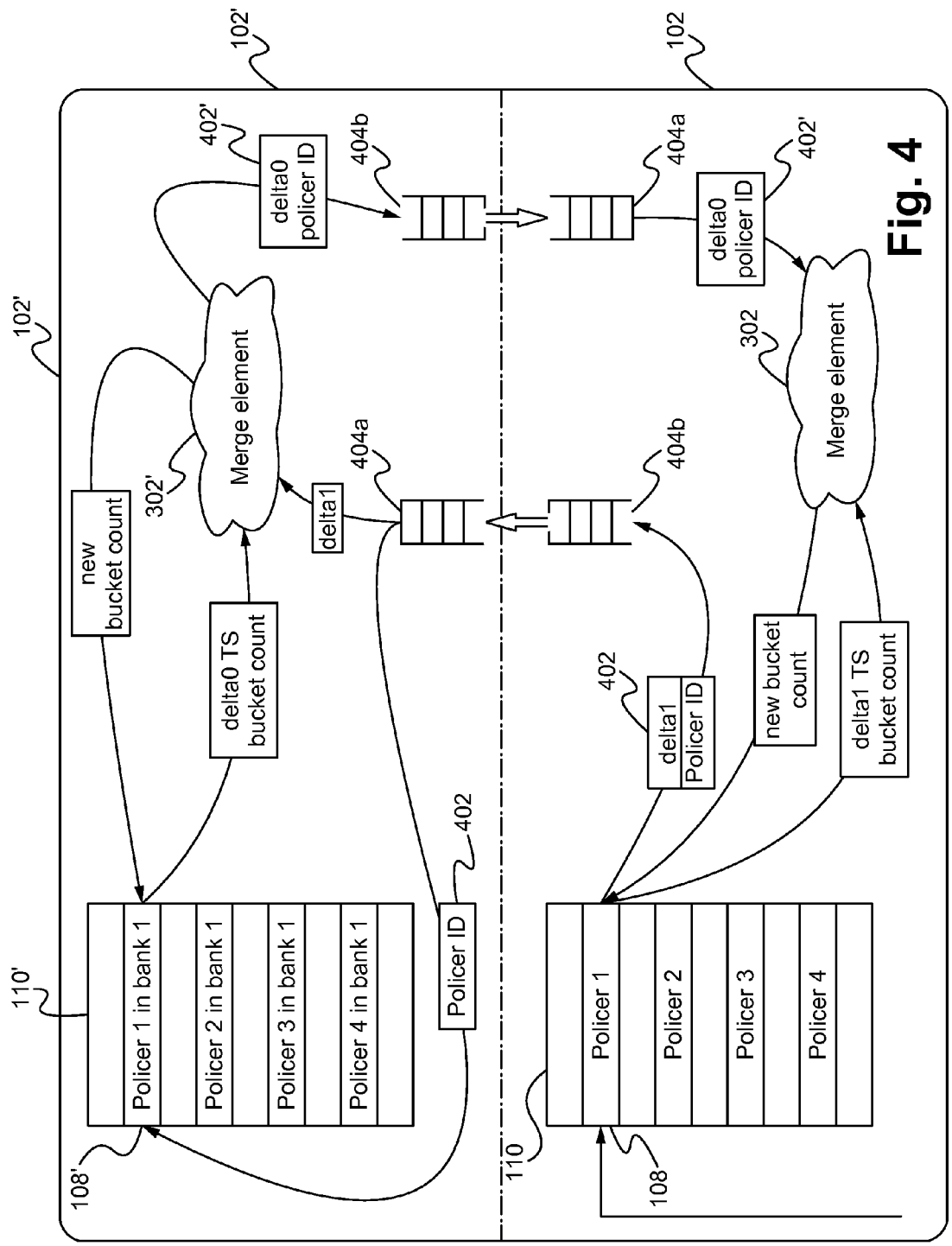
FIG. 4 illustrates a flow diagram of a global state synchronization according to some embodiments.

Each bank of the global policers 108 is able to represent a logical combination 112 of a plurality of the physical banks 106 of physical policers 104. Specifically, each global policer 108 is able to be associated with a plurality of physical policers 104 (e.g. one from each of the physical banks 106 associated with that global bank 110) such that accessing a global policer 108 is representative of accessing the combination of the physical policers 104. In some embodiments, each block 102 comprises a single global bank 110 of global policers 108 associated with a plurality of physical banks 106 of physical policers 104. Alternatively, one or more of the blocks 100 are able to have a plurality of global banks 110 of global policers 108 each associated with a plurality of physical banks 106 of physical policers 104. In some embodiments, as shown in FIG. 4 below, each of a plurality of blocks 102 is able to comprise separate, but coupled together, policer systems 100.

In order to effectuate this logical combination within the global policers 108, a scheduler 114 is coupled to both the physical banks 106 and the global bank 110 of policers and is configured to synchronize the state of one of the physical policers 104 (in one of the physical banks 106) with the state of the associated global policer 108 in the global bank 110 each cycle. The scheduler 114 is able to be implemented in hardware and/or software within the block 102. The physical bank 106 (from which one of the physical policers 104 will be selected for state synchronization) chosen for each cycle is able to be selected according to a random or scheduled cycle such that over time all of the physical banks 106 will be chosen. For example, in some embodiments the scheduler 114 selects the physical banks 106 in a round-robin format, one per cycle, such that over multiple cycles eventually all of the physical banks 106 are selected and the selection process begins again. In contrast, the determination of which policer 104 within the physical bank 106 that is selected for synchronization is able to be based on which one of the physical policers 104 within the bank 106 was accessed by the traffic 116 that cycle. In other words, each cycle one of the physical policers 104 in a bank 106 is accessed by the traffic 116 based on the needs of the traffic and this selection by the traffic is able to also be used to determine which policer 104 is selected for state synchronization.

Further, due to the randomness of traffic (and therefore policer accesses) within the blocks 102 over time, all of the policers 104 of each physical bank 106 are eventually selected for synchronization with the associated global policer 108 in the associated global bank 110. Accordingly, each cycle, the scheduler 114 is able to select the physical policer 104 being accessed by traffic of a selected physical bank 106 for state synchronization with the associated global policer 108 within the associated global bank 110. In some embodiments, as shown in FIG. 1, the block 102 is able to also receive data from one or more additional blocks 118 and/or one or more additional global banks 120 as will be discussed in detail below. Alternatively, the additional blocks 110, the additional global banks 120 and the associated additional data and/or connections are able to be omitted.

FIG. 2 illustrates exemplary state fields 202 and state values 204 of one of the physical policers 104 and a corresponding global policer 108 according to some embodiments. As shown in FIG. 2, the state fields 202 of the physical policer 104 and global policer 108 are able to comprise a peak bucket count (bckt_cnt_p), peak time stamp (time_stamp_p), committed bucket count (bckt_cnt_c) and committed time_stamp (time_stamp_c), wherein the physical policer 104 includes peak and committed local deltas (local_delta_p, local_delta_c) and the global policer 108 includes peak and committed global deltas (global_delta_p, global_delta_c). The peak and committed bucket count values 204 represent a current number of peak and committed data units within the "leaky bucket" of the associated policer respectively. In other words, the bucket count values represent the number of data units that have accessed (e.g. been "added to") the bucket (or the associated policer) minus the data units "exiting" the bucket during a time period. Specifically, this quantity of data units exiting is equal to a leak rate multiplied by a time since the last synchronization of the policer occurred which can be calculated by determining a difference between a current time stamp and the value of the stored time stamp 204. The leak rate is able to be equal to a committed information rate, a peak information rate or another predetermined rate (e.g. data units/time). Thus, the bucket count values increase according to the number of data units (e.g. one per packet or one per byte) accessing the policer associated with the bucket count and drain/decrease with time at a rate of (current_time_stamp−stored_time_stamp)*leak-rate, where leak rate is either the committed information rate or peak information rate. As will be described in detail below, these bucket values are updated periodically each synchronization wherein all of the data units that accessed the policer and drained out of the policer during that time are calculated and applied to the bucket value at those periods.

The peak and committed local delta values 204 represent the total traffic/data units count received in the corresponding local bucket (or accessing the associated policer) since the last local synchronization with the associated global policer and the peak and committed global delta values 204 represent the total traffic/data units count received in the corresponding global bucket (or accessing the associated policer) since the last local synchronization with the associated global policer. In other words, the local and global deltas are able to track a gross data unit count whereas the local and global bucket counts are able to track a net data unit count. Unlike the bucket values 204, these delta values 204 are able to be updated dynamically in between synchronization events in order to reflect the "added" data units between those events. The peak and committed time stamp values 204 are the time that the bucket counts and/or delta counts were last reset or synchronized respectively. Thus, the time stamp values 204 are able to be used to determine how much time has passed in between synchronizations. Additionally, it is understood that the physical and/or global policers 104, 108 are able to have more or less state fields. For example, in some embodiments the physical policers 104 each comprise one or more additional fields having values of the group consisting of a committed burst size, a peak burst size, a committed information rate, a peak information rate, color-awareness control, whether to drop red/yellow data units and a remark based on pol_parameter. In some embodiments, if the system 100 only includes a single global bank 110 of global policers 108, the delta global values are able to be omitted.

Figure 3:
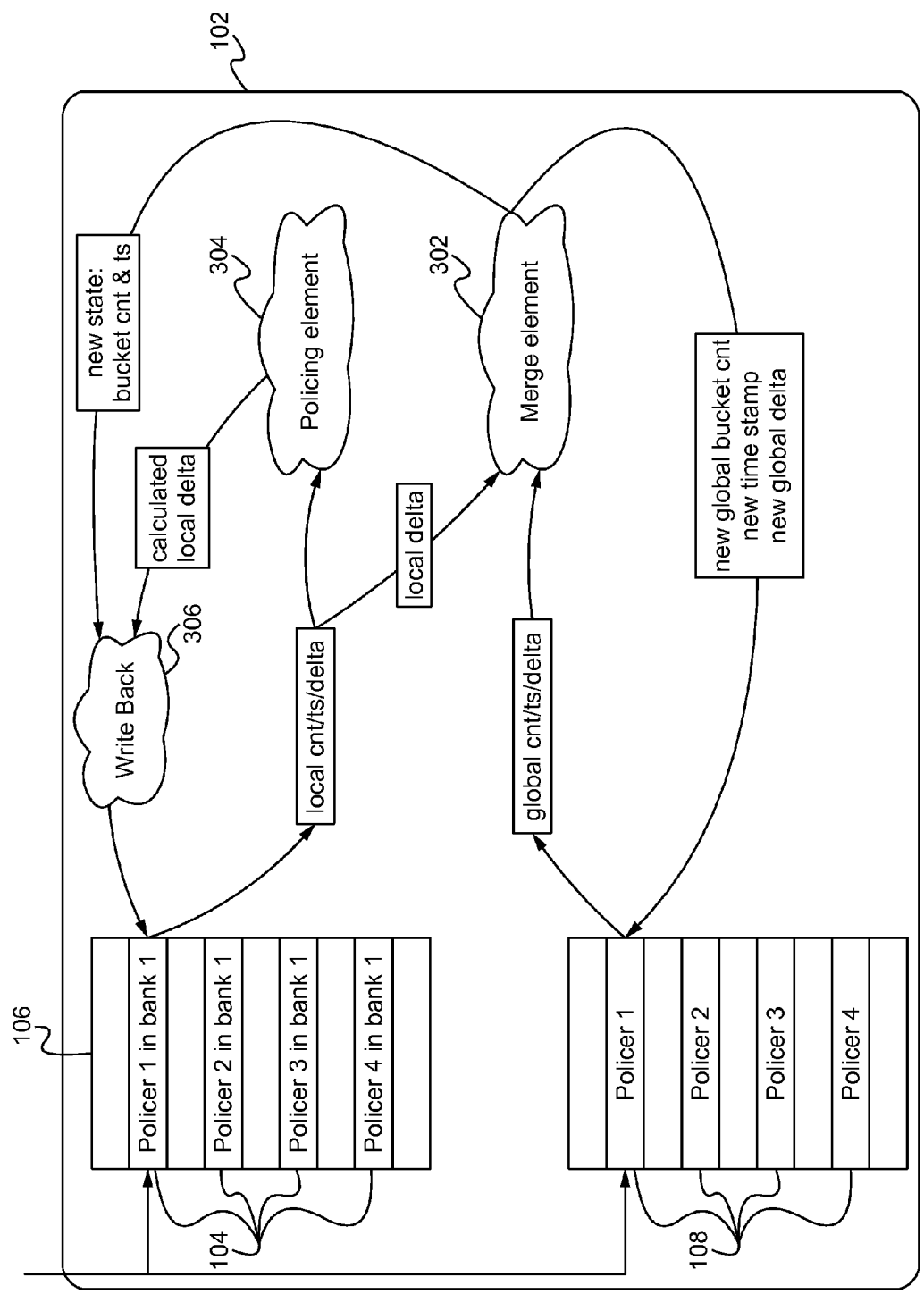
FIG. 3 illustrates a flow diagram of a local state synchronization process according to some embodiments.

FIG. 3 illustrates a flow diagram of a local state synchronization process according to some embodiments. As shown in FIG. 3, the state synchronization each cycle is able to comprise sending the local delta from the selected physical policer 104 and the global delta, global bucket count and global time stamp from the associated global policer 108 to a merging element 302 including merging logic within the block 102. The merging element 302 is able to be implemented in hardware and/or software within the block 102. The merging element 302 combines this received local delta with the global bucket count (minus the "lost" traffic from the leaky bucket since the last synchronization e.g., minus leak rate multiplied by time change, which equal to current time stamp minus stored time stamp 204) to generate a new global bucket count. The local delta is also added to the global delta forming a new global delta. This new global bucket count replaces the old global bucket count, the new global delta replaces the old global delta and the global time stamp is set to the current time. This new global bucket count, global time stamp and global delta are then sent back to the associated global policer 108. Additionally, the new global bucket count (and/or time stamp) is sent to the selected physical policer 104 which assigns the new global bucket count value as its new local bucket count value, resets the local time stamp to the current time (or the received global time stamp value) and sets the local delta to zero. As a result, the state of the associated global policer 108 is able to be synchronized with the state of the selected physical policer 104, wherein over multiple cycles the global policers 108 in the global banks 110 are effectively synchronized with the states of all the physical policers 104 with which they are associated.

At the same time, a policing element 304 within the block 102 is able to receive the local bucket count, local time stamp and/or local delta values and perform the policing necessary for the cycle based on the accessing traffic 116. After the policing is completed, the policing element 304 sends a calculated local delta (based on the accessing traffic 116) back to the selected policer 104 which adds the calculated local delta value (e.g. the added traffic from the cycle) to the reset local delta value (e.g. zero) to determine its new local delta value. In some embodiments, the merging element 302 is able to be a part of the global policer/global bank such that the state synchronization each cycle is able to comprise sending the above data to and receiving the above data from the merging element 302 within the associated global policer 108. Similarly, in some embodiments, the policing element 304 is able to be a part of the local policer/local bank. In some embodiments, the merging element 302 and the scheduler 114 are able to be combined into a single element that does both functions. In some embodiments, the system 100 comprises a write back element 306 implemented in hardware and/or software on the block 102 that performs the writing/assigning of the new state values (e.g. calculated delta; new bucket count; new time stamp) to the physical policers 108. Alternatively, the write back element 306 is able to be omitted or combined with the merge and/or policing elements 302, 304 such that those elements 302, 304 perform the writing/assigning of the state values.

In other words, the local synchronization is able to comprise the global bucket value being updated by adding the delta value of the physical policer, minus leak rate multiplied by time change since stored time stamp; the global delta value being incremented by the same amount as physical policer delta value; the local delta value being reset to zero after local synchronization; and the local bucket value being set (synchronized) to the new global bucket count.

FIG. 4 illustrates a flow diagram of a global state synchronization according to some embodiments. As shown in FIG. 4, the global state synchronization is similar to the local state synchronization except it is performed between two or more global banks 110 of global policers 108 peer-to-peer on the same or different blocks 102. In particular, although FIG. 4 shows two global policer banks 110, 110' on two different blocks 102, 102' being globally synchronized, the same or other numbers of global banks 110, 110' on the same or other numbers of blocks 102, 102' are able to be globally synchronized in the same manner. Thus, there is able to be global synchronization between multiple global banks 110, 110' on the same block 102, 102' and/or between multiple blocks 102, 102' having single or multiple global banks 110, 110' each. Further, the global bank 110 and/or scheduler 114 in each block 102 are able to be configured to independently (of each other) initiate an block or global bank synchronization after a predetermined number of cycles or time period has elapsed from the previous block/global bank synchronization. Because the initiations are independent of each other, one block 102 does not need to communicate with the other block 102 before beginning the synchronization and/or the predetermined number of cycles or time periods are able to be different for different blocks 102.

The cycle that occurs at the predetermined time in each block 102 is able to be reserved as the block/global bank synchronization cycle. During this reserved cycle, the global policer 108 that was last accessed in the first block 102 sends its global delta to the merge element 302' and its global policer identifier 402 to the associated global policer 108' in the global bank 110' in the second block 102'. In particular, based on the received the global policer identifier 402, the transmitting global policer 108 is able to be identified and therefore the associated global policer 108' is able to be determined). In response, the associated global policer 108' in the second block 102' sends its global delta (and its global policer identifier 402') to the merge element 302 in the first block 102 via the merge element 302'. Alternatively, the associated global policer 108' is able to send its global delta to the merge element 302 directly. In some embodiments, instead of in response to receiving the global policer identifier 402, the associated global policer 108' in the second block 102' sends its global delta (and its global policer identifier 402') to the merge element 302 in the first block 102 via the merge element 302' in response to generation of a new global bucket count utilizing the received global delta from the global policer 108 identified by the identifier 402. In some embodiments, in response to the policer identifier 402 the associated global policer 108' also sends its global bucket count, time stamp and/or global delta to the merge element 302' for merging with the received delta of the first block 102. Alternatively, the merge element 302' is able to notify the associated global policer 108' to send its bucket count, time stamp and/or global delta upon receipt of the delta from the first block 102.

Upon receipt of the global deltas (which will likely occur during different cycles due to the transmission delay), both the global policer 108 of the first block 102 and the global policer 108' of the second block 102' update their global bucket counts via the merge elements 302, 302' by sending their global bucket counts, global time stamps and global delta values to the merge element 302, 302' of their block 102, 102'. Specifically, the merge elements 302, 302' are able to add the global deltas received from global policer 108, 108' of the other block 102, 102' to the global bucket count of the associated policer 108, 108' of their block 102, 102' and subtract the "lost" traffic from the global bucket since the last synchronization as determined by the global time stamp of the policer 108, 108' of their block 102, 102' (e.g., the leak rate of the global policer multiplied by a time change which equal to current time stamp minus stored global time stamp 204) to generate new global bucket counts for the selected global policers 108, 108' in their block 102, 102'. In some embodiments, upon receipt of the global delta and identifier 402' of the second block 102', the merge element 302 of the first block 102 notifies the corresponding global policer 108 (e.g. as determined by the global policer identifier 402') to send its bucket count, time stamp and/or global delta so that the merge element 302 is able to perform the above merge function. Alternatively, the merge element 302 is able to wait and perform the merge function at the next cycle involving the corresponding global policer 108 and associated bucket count, time stamp and/or global delta.

In addition, both the global policer 108 of the first block 102 and the global policer 108 of the second block 102 are able to set their time stamp to the current time and reset the global delta to zero via the merge elements 302, 302'. In other words, after each one of the global policers 108 send out their global deltas to be merged with another global policer (either of their own initiative or in response to a received global delta from another global policer 108, that one of the global policers 108 resets its global delta value to zero. As a result, similar to the local synchronization process, over time the global banks 110 in different blocks 102 are able to have synchronized states. Further, as shown in FIG. 4, in some embodiments each block 102 comprises an input queue 404a and/or an output queue 404b (e.g. FIFO queues) that receive and temporarily stores the input and/or output block/global bank synchronization data (e.g. global deltas, policer identifiers) until the block 102, 102' is able to input and/or output the information. Alternatively, the queues are able to be omitted.

In other words, the global synchronization is able to comprise: one source global policer initiating a synchronization process to other global policers by sending out its global delta value (and reset the value in its own state afterwards); the destination global policers each updating their bucket count by adding the received delta value minus leak rate multiplied by time change, which equal to current time stamp minus stored time stamp; the destination policers then responding to the synchronization by sending out (and reset afterwards) their own delta value; and the original source global policer then receive and update its bucket value.

Figure 5:
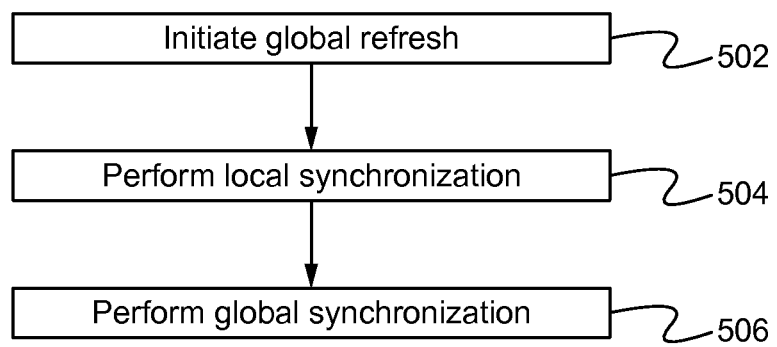
FIG. 5 illustrates a global refresh process according to some embodiments.

FIG. 5 illustrates a global refresh process according to some embodiments. In particular, the global refresh process is able to provide a function wherein all of the physical policers 104 of all of the banks (in each of the blocks 102) are synchronized with the associated global policers 108 of the global banks 110. Additionally, this local refresh is able to be followed by a global refresh (e.g. interblock or intrablock) between all or some of the global policers 108 of the banks 110 in the different blocks 102. As shown in FIG. 5, the global bank 110 and/or scheduler 114 in each block 102, after a predetermined number of cycles or time period, are able to initiate a global refresh at the step 502. Alternatively, the global refresh is able to be initiated in only a single one of the blocks 102. First, a full local synchronization is performed for each of the logical policers 112 at the step 504. The full local synchronization comprising wherein the states of the first logical policer 112 (e.g. the states of the first physical policers 104 in all of the banks 106 associated with a global bank 110) are synchronized with the first global policer 108 of the global bank 110. In particular, all of the physical policers 104 of the first logical policer 112 are able to consecutively synchronized with the corresponding global policer 108 using repetitions of the local synchronization process for each of the physical policers 104 of the first logical policer 112 as described above. Alternatively, the process is able to occur simultaneously wherein all of the local deltas of the physical policers 104 of the first logical policer 112 are added to the global bucket count of the associated global policer 108 minus the "lost" traffic from the leaky bucket since the last synchronization to generate a new global bucket count. Additionally, all of the local deltas of the physical policers 104 of the first logical policer 112 are added to the global delta generating a new global delta. In either case, this new global bucket count replaces the old global bucket count, the new global delta replaces the old global delta and the global time stamp is set to the current time. This new global bucket count is then sent back to all of the first physical policers 104 of the first logical policer 112 which assign the value as their new local bucket count, reset the time stamp to the current time and set the local delta to zero.

This process is then able to be repeated for all the remaining sets of physical policers 104 and the associated global policer 108 until all of the physical policers 104 in the physical banks 106 have states that are synchronized with the associated global policers 108 in the associated global bank 110 such that the full local synchronization is completed. Alternatively, the process is able to be limited to a single set of the physical policers 104 and the associated global policer 108 wherein the selected set is based on which set of policers includes the policer that was last accessed. In some embodiments, this full local synchronization of all the physical policers 104 with the associated global policers 108 is able to occur at the same time or concurrently in a plurality of or all the blocks 102. Alternatively, the refresh synchronization in one of the blocks 102 is able to be used to trigger/initiate the global refresh synchronization in one or more of the other blocks 102 such that the synchronization in the blocks 102 occurs sequentially.

After the full local synchronization, one or more of the blocks 102 are able to perform a full global synchronization in order to synchronize their respective global blocks 110 with each other at the step 506. In particular, this full global synchronization is able to be substantially the same as the block synchronization discussed in FIG. 4 except that it is able to be performed for a plurality or all of the global policers 108, not just the global policer 108 that was last accessed. As a result, unlike the block synchronization, the full global synchronization results in a plurality or all (i.e. more than just one) of the global policers 108 being synchronized between two or more blocks 102 at once.

In particular, the full global synchronization is able to comprise sending (e.g. consecutively or simultaneously) from one or more "slave" blocks 102 the new global deltas (calculated during the full local synchronization) and global policer identifiers 402 for one or more of the global policers 108 to the merge element 302' and/or corresponding global policers 108' in the global bank 110' of a "master" block 102'. Upon receiving these new global deltas and identifiers 402, the "master" block 102' is able to initiate its own full local synchronization with its own logical policers 112 (if it has not already initiated/performed it locally). Subsequently, is the same manner as the block 102 synchronization process in FIG. 4, the master block 102' is able to use the received deltas to calculate new global bucket counts (and new global deltas) for each global policer 108' and send its own global deltas (as calculated during the full local synchronization) and identifiers 402' for one or more of their global policers 108' back to the "slave" blocks 102. Thus, the "slave" blocks 102 are able to similarly merge the received global deltas with their own global bucket counts in order to calculate new global bucket counts (and new global deltas) for the global policers 108. Accordingly, all of the "slave" and "master" blocks 102' are able to use the received global deltas and identifiers 402, 402' to calculate new globally synchronized global bucket counts and global deltas. It should be noted however, that each block 102 is able to be a master or a slave depending on whether the block 102 is the first or second to output its deltas to the other block 102. Therefore, the global refresh process is able to provide the advantage of fully synchronizing both the states of all the physical policers 104 and the corresponding the global policers 108 in each of the blocks 102 and the states of the global policers 108 in each block 102. The global refresh process as a whole or the full local and/or full global synchronizations individually are able to occupy a plurality of cycles forming a global refresh period.

The policer system described herein has numerous advantages. In particular, the scheduler synchronization of the global policers with a plurality of physical policers enables the system to virtually provide multiple accesses to the physical policers despite their implementation in memory only enabling a single access per cycle. Further, the local and block synchronization along with the global refresh process together provide the advantage of enabling multiple blocks of multiple global and physical policers to all become synchronized over time such that they emulate a single policer that is able to be accessed many times per cycle.

One of ordinary skill in the art will realize other uses and advantages also exist. While the invention has been described with reference to numerous specific details, one of ordinary skill in the art will recognize that the invention can be embodied in other specific forms without departing from the spirit of the invention. For example, although the policer system described herein utilizes two levels of policers (i.e. physical policers and global policers), additional levels are contemplated such as "universal" policers (e.g. a higher level of policers) that have the same relationship with the global policers (e.g. the next lower level of policer) that the global policers have with the physical policers. In such embodiments, the same synchronization processes are able to be used for the upper levels relative to the lower levels as described in relationship to the physical and global policers described above. As another example, although the different methods described herein describe a particular order of steps, other orders are contemplated as well as the omission of one or more of the steps and/or the addition of one or more new steps. Moreover, although the methods above are described herein separately, one or more of the methods are able to be combined (in whole or part) in order to describe a more comprehensive method or process of operation of the policer system. Thus, one of ordinary skill in the art will understand that the invention is not to be limited by the foregoing illustrative details, but rather is to be defined by the appended claims.

We claim:

1. A traffic policer system for policing traffic, the system comprising:
    a plurality of physical memory banks each storing a plurality of physical policers;
    a global memory bank storing a plurality of global policers, wherein each of the global policers is associated with a different one of the physical policers in each of the physical memory banks; and
    a scheduler element coupled with the physical memory banks and the global memory bank, wherein the scheduler element:
        selects one physical memory bank from the plurality of physical memory banks, wherein the plurality of physical policers stored on the one physical memory bank is a subset of all of the physical policers stored on the plurality of physical memory banks;
        selects one physical policer from the subset; and
        performs a local synchronization that synchronizes a state of the selected one physical policer with a state of the associated global policer during a cycle.

2. The system of claim 1, wherein the state of each of the physical policers and the global policers comprise a bucket value, a time stamp value and a delta value, and further wherein:
    the time stamp value of each of the physical policers represents when the physical policer was last synchronized with the associated global policer;
    the delta value of each of the physical policers represents a quantity of data units of a traffic flow that have accessed the physical policer since the physical policer was last synchronized with the associated global policer; and
    the bucket value of each of the physical policers represents a first number equal to the data units of the traffic flow that have accessed the physical policer during a first period minus a second number, wherein the second number is equal to a leakage rate of the physical policer multiplied by the first period.

3. The system of claim 2, wherein the scheduler element determines the one of the physical policers that is selected from the one of the physical memory banks based on which of the physical policers of the one of the physical memory banks was accessed by incoming traffic during the cycle.

4. The system of claim 3, wherein the scheduler element determines the one of the physical memory banks from which to select the one of the physical policers based on a repeating pattern such that after a predetermined number of cycles the scheduler element will have selected the one of the physical policers from all the physical memory banks.

5. The system of claim 4, wherein the local synchronization comprises determining a new global bucket value by:
    determining an added value by adding the delta value of the one of the physical policers that is selected and the bucket value of the associated global policer;
    determining a leakage value by multiplying a leakage rate of the associated global policer by a difference between the time stamp value of the associated global policer and the current time; and
    subtracting the leakage value from the added value.

6. The system of claim 5, wherein the scheduler performs the local synchronization only on the selected one of the physical policers during the cycle and the local synchronization comprises replacing the bucket values of the states of the one of the physical policers and the associated global policer with the new global bucket value.

7. A traffic policer system for policing traffic, the system comprising:
    a plurality of physical memory banks each storing a plurality of physical policers;
    a global memory bank storing a plurality of global policers, wherein each of the global policers is associated with a different one of the physical policers in each of the physical memory banks;
    a scheduler element coupled with the physical memory banks and the global memory bank, wherein the scheduler element selects one physical policer from a plurality of possible physical policers of the physical policers of one of the physical memory banks, and performs a local synchronization that synchronizes a state of the selected one physical policer with a state of the associated global policer during a cycle;
    a plurality of additional physical memory banks each storing a plurality of additional physical policers;
    an additional global memory bank storing a plurality of additional global policers, wherein each of the additional global policers is associated with a different one of the additional physical policers in each of the additional physical memory banks; and
    an additional scheduler element coupled with the additional physical memory banks and the additional global memory bank, wherein the additional scheduler element performs the local synchronization that synchronizes a state of one of the additional physical policers of one of the additional physical memory banks with a state of the associated additional global policer during an additional cycle;
    wherein the global memory bank is coupled with the additional global memory bank, each of the global policers are associated with a different one of the additional global policers, and the scheduler element and the additional scheduler element are configured to perform a global synchronization that synchronizes a state of one of the global policers with a state of one of the additional global policers associated with the one of the global policers during a global cycle.

8. The system of claim 7, wherein:
    a time stamp value of each of the global policers represents when the global policer was last globally or locally synchronized;
    a delta value of each of the global policers represents a quantity of data units of the traffic flow that have accessed the global policer since the global policer was last globally or locally synchronized with one of the additional global policers; and
    a bucket value of each of the global policers represents a third number equal to the data units of the traffic flow that have accessed the global policer during a second period minus a fourth number, wherein the fourth number is equal to a leakage rate of the global policer multiplied by the second period.

9. The system of claim 8, wherein the physical memory banks, the global memory bank and the scheduler element are stored on a processing block, and the additional physical memory banks, the additional global memory bank and the additional scheduler element are stored on an additional processing block coupled with the processing block.

10. The system of claim 9, wherein the scheduler element and the additional scheduler element initiate and perform the global synchronization independently such that each of the scheduler element and the additional scheduler element are able to perform the global synchronization during different cycles.

11. The system of claim 10, wherein the scheduler element determines the one of the global policers based on which of the global policers was accessed by incoming traffic during the global cycle and the additional scheduler element determines the one of the additional global policers based on which of the additional global policers was accessed by incoming traffic during the global cycle.

12. The system of claim 11, wherein the global synchronization comprises determining an updated global bucket value by:
    determining a global added value by adding the bucket value of the one of the global policers that is selected and the delta value of the one of the addition global policers;
    determining a global leakage value by multiplying a leakage rate of the one of the global policers by a difference between the time stamp value of the one of the global policers and the current time; and
    subtracting the leakage value from the added value.

13. The system of claim 12, wherein the scheduler element performs a global refresh process including a full local synchronization that, for each of the global policers, synchronizes the states of the global policer and all of the physical policers associated with the global policer during a global refresh period.

14. The system of claim 13, wherein the full local synchronization comprises, for each of the global policers, consecutively performing the local synchronization with each of the physical policers associated with the global policer.

15. The system of claim 14, wherein the global refresh process includes a full global synchronization that, for each of the global policers, synchronizes the state of the global policer with the state of all of the additional global policers associated with the global policer during the global refresh period.

16. The system of claim 15, wherein the full global synchronization comprises, for each of the global policers, consecutively performing the global synchronization with each of the additional global policers associated with the global policer.

17. The system of claim 16, wherein each of the data units is either a byte or an entire packet of the traffic.

18. A traffic scheduler stored on a non-transitory computer readable medium and configured to control traffic on a policer system, wherein the scheduler is coupled with a plurality of physical memory banks each storing a plurality of physical policers and a global memory bank storing a plurality of global policers, wherein each of the global policers is associated with a different one of the physical policers in each of the physical memory banks, and further wherein the scheduler is configured to:
    select one physical memory bank from the plurality of physical memory banks, wherein the plurality of physical policers stored on the one physical memory bank is a subset of all of the physical policers stored on the plurality of physical memory banks;
    select one physical policer from the subset: and
    perform a local synchronization that synchronizes a state of the selected one physical policer with a state of the associated global policer during a cycle.

19. The scheduler of claim 18, wherein the state of each of the physical policers and the global policers comprise a bucket value, a time stamp value and a delta value, and further wherein:
    the time stamp value of each of the physical policers represents when the physical policer was last synchronized with the associated global policer;
    the delta value of each of the physical policers represents a quantity of data units of a traffic flow that have accessed the physical policer since the physical policer was last synchronized with the associated global policer; and
    the bucket value of each of the physical policers represents a first number equal to the data units of the traffic flow that have accessed the physical policer during a first period minus a second number, wherein the second number is equal to a leakage rate of the physical policer multiplied by the first period.

20. The scheduler of claim 19, wherein the scheduler determines the one of the physical policers that is selected from the one of the physical memory banks based on which of the physical policers of the one of the physical memory banks was accessed by incoming traffic during the cycle.

21. The scheduler of claim 20, wherein the scheduler determines the one of the physical memory banks from which to select the one of the physical policers based on a repeating pattern such that after a predetermined number of cycles the scheduler will have selected the one of the physical policers from all the physical memory banks.

22. The scheduler of claim 21, wherein the local synchronization comprises determining a new global bucket value by:
    determining an added value by adding the delta value of the one of the physical policers that is selected and the bucket value of the associated global policer;
    determining a leakage value by multiplying a leakage rate of the associated global policer by a difference between the time stamp value of the associated global policer and the current time; and
    subtracting the leakage value from the added value.

23. The scheduler of claim 22, wherein the scheduler performs the local synchronization only on the selected one of the physical policers during the cycle and the local synchronization comprises replacing the bucket values of the states of the one of the physical policers and the associated global policer with the new global bucket value.

24. A traffic scheduler stored on a non-transitory computer readable medium and configured to control traffic on a policer system, wherein the scheduler is coupled with a plurality of physical memory banks each storing a plurality of physical policers and a global memory bank storing a plurality of global policers, wherein each of the global policers is associated with a different one of the physical policers in each of the physical memory banks, and further wherein the scheduler is configured to select one physical policer from a plurality of possible physical policers of the physical policers of one of the physical memory banks, and perform a local synchronization that synchronizes a state of the selected one physical policer with a state of the associated global policer during a cycle, wherein each of the global policers are associated with a different one of additional global policers, and the scheduler performs a global synchronization that synchronizes a state of one of the global policers with a state of one of the additional global policers associated with the one of the global policers during a global cycle.

25. The scheduler of claim 24, wherein:
a delta value of each of the global policers represents a quantity of data units of the traffic flow that have accessed the global policer since the latest global synchronization of the global policer with the associated one of the additional global policers; and
a bucket value of each of the global policers represents a third number of the data units of the traffic flow that have accessed the global policer during a second time period minus a fourth number of the data units, wherein the fourth number is equal to a leakage rate of the global policer multiplied by the second time period, and further wherein the second time period is equal to the difference between the current time and a global policer time value of a time stamp of the global policer.

26. The scheduler of claim 25, wherein the non-transitory computer-readable medium is a part of a processing block and the additional global policers are stored on an additional global memory bank that is a part of an additional processing block coupled with the processing block.

27. The scheduler of claim 26, wherein the scheduler initiates and performs the global synchronization independent of performance of the global synchronization by an additional scheduler on the additional processing block.

28. The scheduler of claim 27, wherein the scheduler determines the one of the global policers based on which of the global policers was accessed by incoming traffic during the global cycle.

29. The scheduler of claim 28, wherein the global synchronization comprises determining an updated global bucket value by:
determining a global added value by adding the bucket value of the one of the global policers that is selected and the delta value of the one of the addition global policers;
determining a global leakage value by multiplying a leakage rate of the one of the global policers by a difference between the time stamp value of the one of the global policers and the current time; and
subtracting the leakage value from the added value.

30. The scheduler of claim 29, wherein the scheduler performs a global refresh process including a full local synchronization that, for each of the global policers, synchronizes the states of the global policer and all of the physical policers associated with the global policer during a global refresh period.

31. The scheduler of claim 30, wherein the full local synchronization comprises, for each of the global policers, consecutively performing the local synchronization with each of the physical policers associated with the global policer.

32. The scheduler of claim 31, wherein the global refresh process includes a full global synchronization that, for each of the global policers, synchronizes the state of the global policer with the state of all of the additional global policers associated with the global policer during the global refresh period.

33. The scheduler of claim 32, wherein the full global synchronization comprises, for each of the global policers, consecutively performing the global synchronization with each of the additional global policers associated with the global policer.

34. The scheduler of claim 33, wherein each of the data units is either a byte or an entire packet of the traffic.

35. A method of performing synchronization on a policer traffic system stored on an non-transitory computer-readable medium and including a plurality of physical memory banks each storing a plurality of physical policers and a global memory bank storing a plurality of global policers, wherein each of the global policers is associated with a different one of the physical policers in each of the physical memory banks, the method comprising:
selecting one of the plurality of physical memory banks with a scheduler, wherein the plurality of physical policers stored on the one physical memory bank is a subset of all of the physical policers stored on the plurality of physical memory banks;
selecting one physical policer from the subset; and
performing a local synchronization with the scheduler by synchronizing a state of the selected one of the physical policers of the selected one of the physical memory banks with a state of one of the global policers associated with the selected one of the physical policers during a cycle, wherein the scheduler is coupled with the physical memory banks and the global memory bank.

36. The method of claim 35, wherein the state of each of the physical policers and the global policers comprise a bucket value, a time stamp value and a delta value, and further wherein:
the time stamp value of each of the physical policers represents when the physical policer was last synchronized with the associated global policer;
the delta value of each of the physical policers represents a quantity of data units of a traffic flow that have accessed the physical policer since the physical policer was last synchronized with the associated global policer; and
the bucket value of each of the physical policers represents a first number equal to the data units of the traffic flow that have accessed the physical policer during a first period minus a second number, wherein the second number is equal to a leakage rate of the physical policer multiplied by the first period.

37. The method of claim 36, wherein the scheduler selects the one of the physical policers based on which of the physical policers of the one of the physical memory banks was accessed by incoming traffic during the cycle.

38. The method of claim 37, wherein the scheduler selects the one of the physical memory banks based on a repeating pattern such that after a predetermined number of cycles the scheduler will have selected all of the physical memory banks at least once.

39. The method of claim 38, wherein the local synchronization comprises determining a new global bucket value by adding the delta value of the one of the physical policers that is selected and the bucket value of the associated global policer.

40. The method of claim 39, wherein the local synchronization comprises determining a new global bucket value by:
determining an added value by adding the delta value of the one of the physical policers that is selected and the bucket value of the associated global policer;

determining a leakage value by multiplying a leakage rate of the associated global policer by a difference between the time stamp value of the associated global policer and the current time; and subtracting the leakage value from the added value.

41. A method of performing synchronization on a policer traffic system stored on an non-transitory computer-readable medium and including a plurality of physical memory banks each storing a plurality of physical policers and a global memory bank storing a plurality of global policers, wherein each of the global policers is associated with a different one of the physical policers in each of the physical memory banks, the method comprising:

selecting one of the plurality of physical memory banks with a scheduler;

selecting one physical policer from a plurality of possible physical policers of the plurality of physical policers on the selected physical bank;

performing a local synchronization with the scheduler by synchronizing a state of the selected one of the physical policers of the selected one of the physical memory banks with a state of one of the global policers associated with the selected one of the physical policers during a cycle, wherein the scheduler is coupled with the physical memory banks and the global memory bank;

a plurality of additional physical memory banks each storing a plurality of additional physical policers;

an additional global memory bank storing a plurality of additional global policers, wherein each of the additional global policers is associated with a different one of the additional physical policers in each of the additional physical memory banks; and an additional scheduler element coupled with the additional physical memory banks and the additional global memory bank, wherein the additional scheduler element performs the local synchronization that synchronizes a state of one of the additional physical policers of one of the additional physical memory banks with a state of the associated additional global policer during an additional cycle, wherein the global memory bank is coupled with the additional global memory bank and each of the global policers are associated with a different one of the additional global policers.

42. The method of claim 41, wherein:

a delta value of each of the global policers represents a quantity of data units of the traffic flow that have accessed the global policer since the latest global synchronization of the global policer with the associated one of the additional global policers; and a bucket value of each of the global policers represents a third number of the data units of the traffic flow that have accessed the global policer during a second time period minus a fourth number of the data units, wherein the fourth number is equal to a leakage rate of the global policer multiplied by the second time period, and further wherein the second time period is equal to the difference between the current time and a global policer time value of a time stamp of the global policer.

43. The method of claim 42, further comprising performing a global synchronization with the scheduler and the additional scheduler by synchronizing a state of one of the global policers with a state of one of the additional global policers associated with the one of the global policers during a global cycle.

44. The method of claim 43, wherein the physical memory banks, the global memory bank and the scheduler are stored on a processing block, and the additional physical memory banks, the additional global memory bank and the additional scheduler are stored on an additional processing block coupled with the processing block.

45. The method of claim 44, wherein the performance of the global synchronization by the scheduler and the performance of the global synchronization by the additional scheduler are independent of each other such that each of the scheduler and the additional scheduler are able to perform the global synchronization during different cycles.

46. The method of claim 45, wherein the scheduler determines the one of the global policers based on which of the global policers was accessed by incoming traffic during the global cycle and the additional scheduler determines the one of the additional global policers based on which of the additional global policers was accessed by incoming traffic during the global cycle.

47. The method of claim 46, wherein the global synchronization comprises determining an updated global bucket value by:

determining a global added value by adding the bucket value of the one of the global policers that is selected and the delta value of the one of the addition global policers;

determining a global leakage value by multiplying a leakage rate of the one of the global policers by a difference between the time stamp value of the one of the global policers and the current time; and subtracting the leakage value from the added value.

48. The method of claim 47, further comprising performing with the scheduler a global refresh process including a full local synchronization that, for each of the global policers, synchronizes the states of the global policer and all of the physical policers associated with the global policer during a global refresh period.

49. The method of claim 48, wherein the full local synchronization comprises, for each of the global policers, consecutively performing the local synchronization with each of the physical policers associated with the global policer.

50. The method of claim 49, wherein the global refresh process includes a full global synchronization that, for each of the global policers, synchronizes the state of the global policer with the state of all of the additional global policers associated with the global policer during the global refresh period.

51. The method of claim 50, wherein the full global synchronization comprises, for each of the global policers, consecutively performing the global synchronization with each of the additional global policers associated with the global policer.

52. The method of claim 51, wherein each of the data units is either a byte or an entire packet of the traffic.

* * * * *